United States Patent [19]
Lewis et al.

[11] Patent Number: 6,029,682
[45] Date of Patent: Feb. 29, 2000

[54] RAPIDLY OPENING ELECTROMAGNETIC VALVE

[75] Inventors: Stephen R. Lewis, Minonk; Charles B. Looney, Gridley; Larry R. Mitzelfelt, Jr., Morton; David E. Martin, Normal; James D. Griffith, Chenoa; Kenneth A. Caron, Normal; William T. Groff, Metamora; J. Duwayne Manahan; Avtar S. Sandhu, both of Bloomington; Wade J. Robel, Normal, all of Ill.

[73] Assignee: Caterpillar Inc., Peoria, Ill.

[21] Appl. No.: 09/121,981

[22] Filed: Jul. 24, 1998

[51] Int. Cl.[7] .................................................. F16K 31/02
[52] U.S. Cl. .......................... 137/1; 251/77; 251/129.02; 251/129.19; 251/176
[58] Field of Search .................. 251/129.19, 129.02, 251/77, 176, 186; 137/1

[56] References Cited

U.S. PATENT DOCUMENTS

| | | | |
|---|---|---|---|
| 4,177,825 | 12/1979 | Crawford | 251/77 X |
| 4,580,760 | 4/1986 | Harris | 251/77 |
| 4,717,118 | 1/1988 | Potter | 251/129.02 |
| 4,869,462 | 9/1989 | Logie et al. | 251/129.19 X |
| 5,118,076 | 6/1992 | Homes | 251/129.19 X |
| 5,172,887 | 12/1992 | Cross et al. | 251/129.19 |
| 5,318,272 | 6/1994 | Smith | 251/186 X |
| 5,375,576 | 12/1994 | Ausman et al. | 123/446 |
| 5,474,107 | 12/1995 | Hayes | 251/77 |
| 5,478,045 | 12/1995 | Ausman et al. | 251/54 |
| 5,687,765 | 11/1997 | You | 251/129.19 |

*Primary Examiner*—Stephen M. Hepperle
*Assistant Examiner*—John Bastianelli
*Attorney, Agent, or Firm*—Eric M. Bram

[57] ABSTRACT

A spool slides in a bore to open and close a valve. An armature moveable relative to the spool is biased in a first direction. A coupling biasing member biases the armature and the spool toward each other. When a solenoid is actuated the armature and the spool move in a second direction opposite the first direction until the spool forcibly engages a seat in the bore, closing the valve and stopping the spool movement. The armature continues to move in the second direction, causing the coupling to apply additional force to keep the spool engaged against the seat, until the armature reaches a second position where it forcibly engages with the spool. This stops the armature from moving further in the second direction, but allows the stationary armature to continue applying force to keep the spool engaged against the seat. When the solenoid is de-energized the armature bias sends the armature back in the first direction until it strikes the spool, causing the spool to rapidly unseat, thus opening the valve. Proper configuration of the spool and bore geometries in the vicinity of the seat keeps static pressure from developing that could otherwise retard spool valve opening.

9 Claims, 6 Drawing Sheets

Fig_1

Fig_2_

Fig_3_

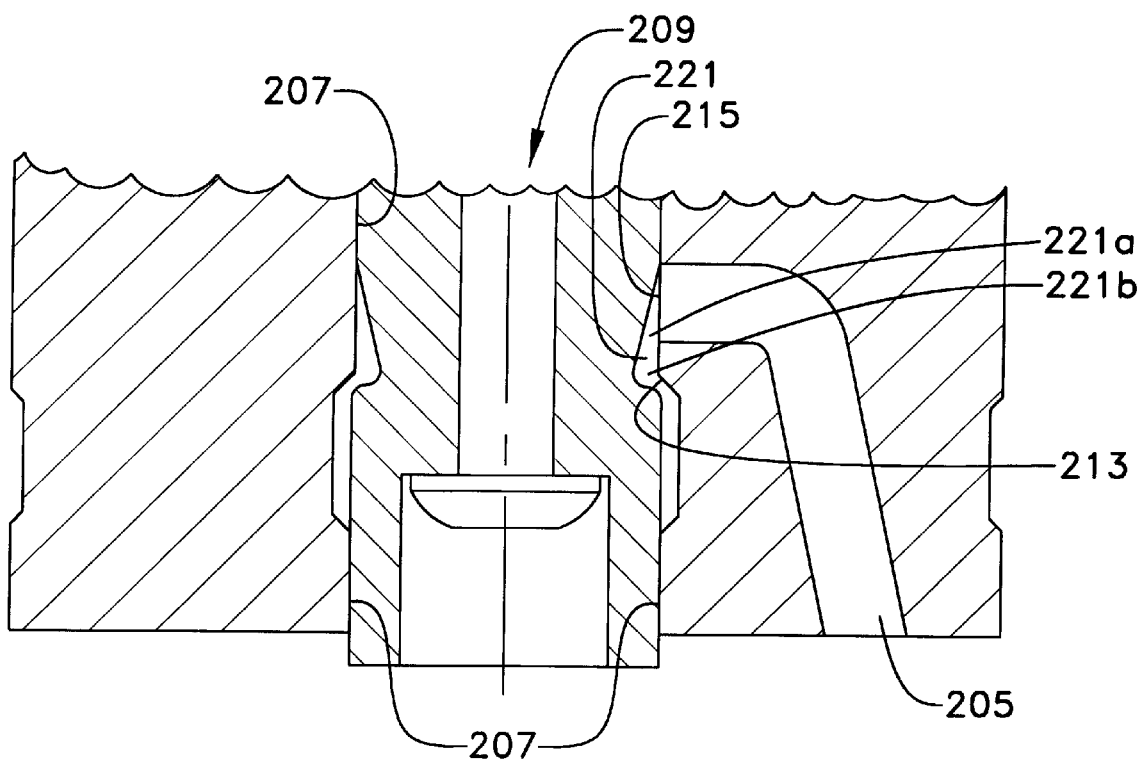

3 # RAPIDLY OPENING ELECTROMAGNETIC VALVE

TECHNICAL FIELD

This invention relates generally to electromagnetic valves, and more particularly to electromagnetic spool valves in fuel supply systems.

BACKGROUND

In many valves, for example poppet valves for fuel injectors, an actuator is used to pull a spool, the poppet for example, to one of at least two positions—one in which the spool engages a seat (to open or close the valve) and one in which the spool is not engaged with the seat. In this type of valve, control of the spool's movement toward and away from its seated position is desirable. For example, it is important to ensure that at the limit of movement of the armature under the action of the solenoid, an air gap remains between the armature and the pole faces of the solenoid.

Additionally, it would be advantageous to keep the spool from slamming against the seat with its entire armature driven force all at once. This can help prevent bouncing for example, and increase product lifetime. Also, it is preferred to have the spool unseat very quickly when the valve is to move to the open valve position, in order to fully open the valve so as to get the full desired fluid flow as quickly as possible.

One valve arrangement designed to control the spool's movement is taught in U.S. Pat. No. 4,869,462 to Logie et al., issued Sep. 26, 1989. In that valve arrangement, a spool slides in a bore to a closed valve position in which the spool is engaging a seat. The spool is electromagnetically driven to the closed valve position by a solenoid with an armature. The armature is attached to a hollow coupling member that is held against the spool by a spring. When the armature pulls the spool against the seat the spool stops, but the armature and coupling member continue to move until a flange of the coupling member hits against a stop surface of an annular housing attached to the solenoid housing. The coupler spring is biased to hold the coupling member against the spool and thereby applies an additional force to keep the spool in its closed valve position.

One drawback of this design, however, is that when the coupling member stops it is resting against the housing, so that any additional force caused by the attraction of the armature-coupling member to the solenoid is lost. It would be desirable to allow that additional force to be used in keeping the spool against the seat.

This invention is directed at overcoming one or more of the above problems.

DISCLOSURE OF THE INVENTION

In one aspect of the invention, an electromagnetic valve in a fuel supply system comprises a valve body including a bore with at least one seat in it. A shuttle assembly including a spool is disposed in the bore so that it can slide between at least an open valve position in which the spool is spaced from the seat, and a closed valve position in which the spool is forcibly engaging the seat.

An armature assembly is connected with the valve body. The armature is moveable relative to the shuttle assembly, and is moveable relative to the valve body along a total range of motion that is limited in a first direction by a first armature position relative to the valve body at which the armature assembly is forcibly engaged with the valve body, and is limited in a second direction opposite the first direction by a second armature position relative to the valve body at which the armature assembly is forcibly engaged with the shuttle assembly.

The armature is able to reach the first armature position only when the spool is at the open position. The armature is able to reach the second armature position only when the spool is at the closed position. The armature is able to reach an intermediate position, between the first armature position and the second armature position, at which the armature assembly is not forcibly engaged with the shuttle assembly.

An armature biasing member is connected with the armature assembly so that it biases the armature in a first direction. A coupler biasing member is connected with the armature assembly and with the shuttle assembly, so that it biases the armature assembly and the shuttle assembly toward each other.

A solenoid is connected to the valve body and is actuateable to move the armature assembly in the second direction. The armature assembly and the shuttle assembly are disposed in the valve in such a way that whenever the armature assembly is at the second armature position the armature assembly is prevented from moving any further in the second direction by the forcible engagement of the armature assembly with the shuttle assembly.

In another aspect of the invention, a method is disclosed for controlling an electromagnetic valve in a fuel supply system, where the valve includes a valve body with a bore having at least one seat, a shuttle assembly including a spool slideably disposed in the bore, an armature assembly movably connected with the valve body and movable relative to the shuttle assembly, and a solenoid connected to the valve body.

With this method, the armature is biased in a first direction, biasing the armature assembly and the shuttle assembly toward each other. The solenoid is actuated to bias the armature assembly in a second direction opposite the first direction. The armature assembly is moved in the second direction.

The valve is closed by sliding the spool in the bore in the second direction until the spool forcibly engages the seat. While the spool is engaging the seat and is not sliding in the bore, the armature assembly continues to be moved in the second direction until the armature assembly forcibly engages with the shuttle assembly, thereby immediately stopping the armature assembly from moving further in the second direction.

The solenoid is de-energized to cause the armature assembly to travel in the first direction until it strikes the shuttle assembly to unseat the spool. The valve is opened by sliding the spool in the bore in the first direction so that the spool is spaced from the seat.

BRIEF DESCRIPTION OF THE DRAWING

FIG. 6 is an enlarged portion of FIG. 4 illustrating one embodiment of an annular groove.

BEST MODE FOR CARRYING OUT THE INVENTION

Figure 1:
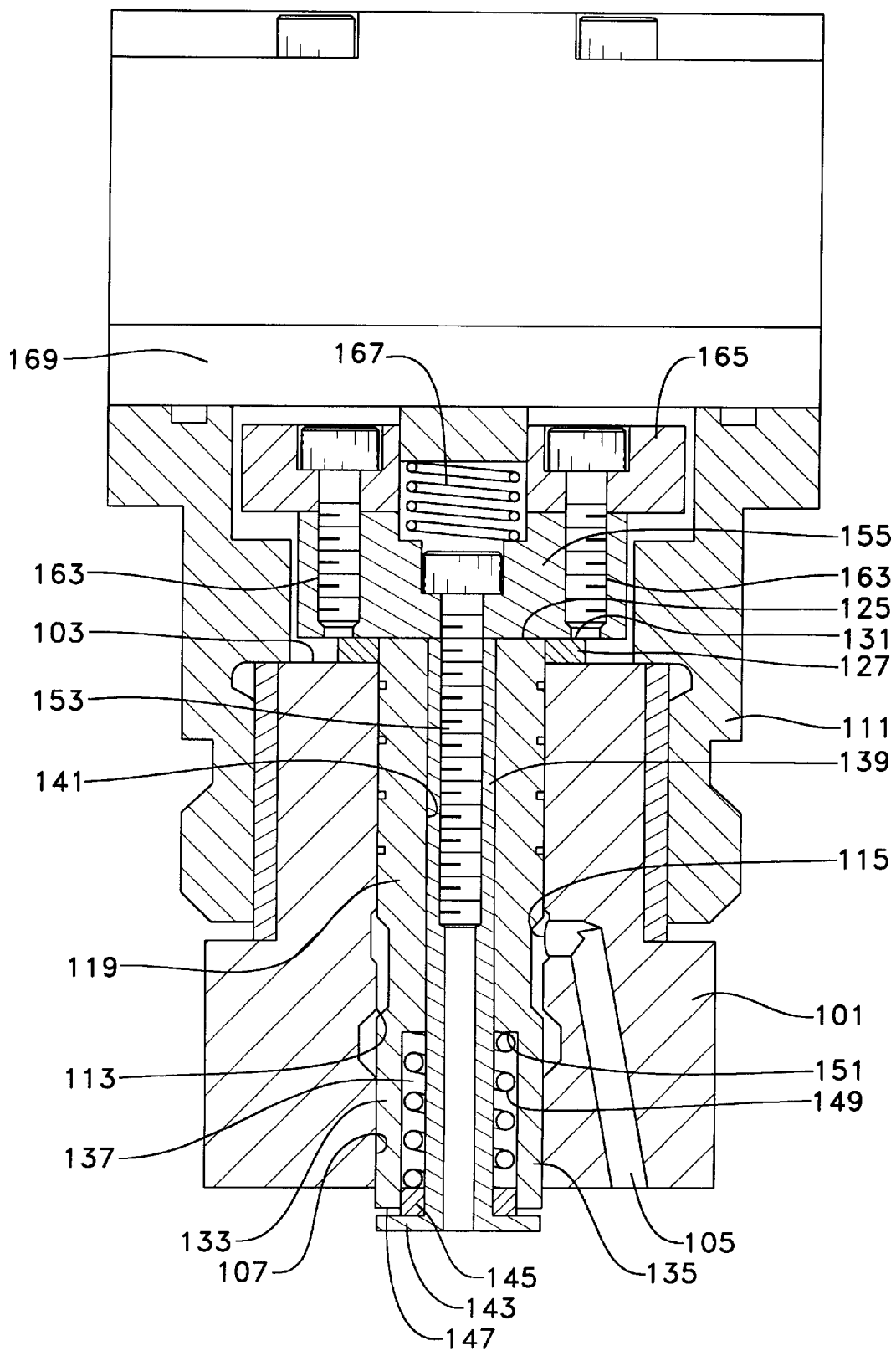
FIG. 1 is a diagrammatic sectional side view of an embodiment of the invention in an open valve position.
Figure 2:
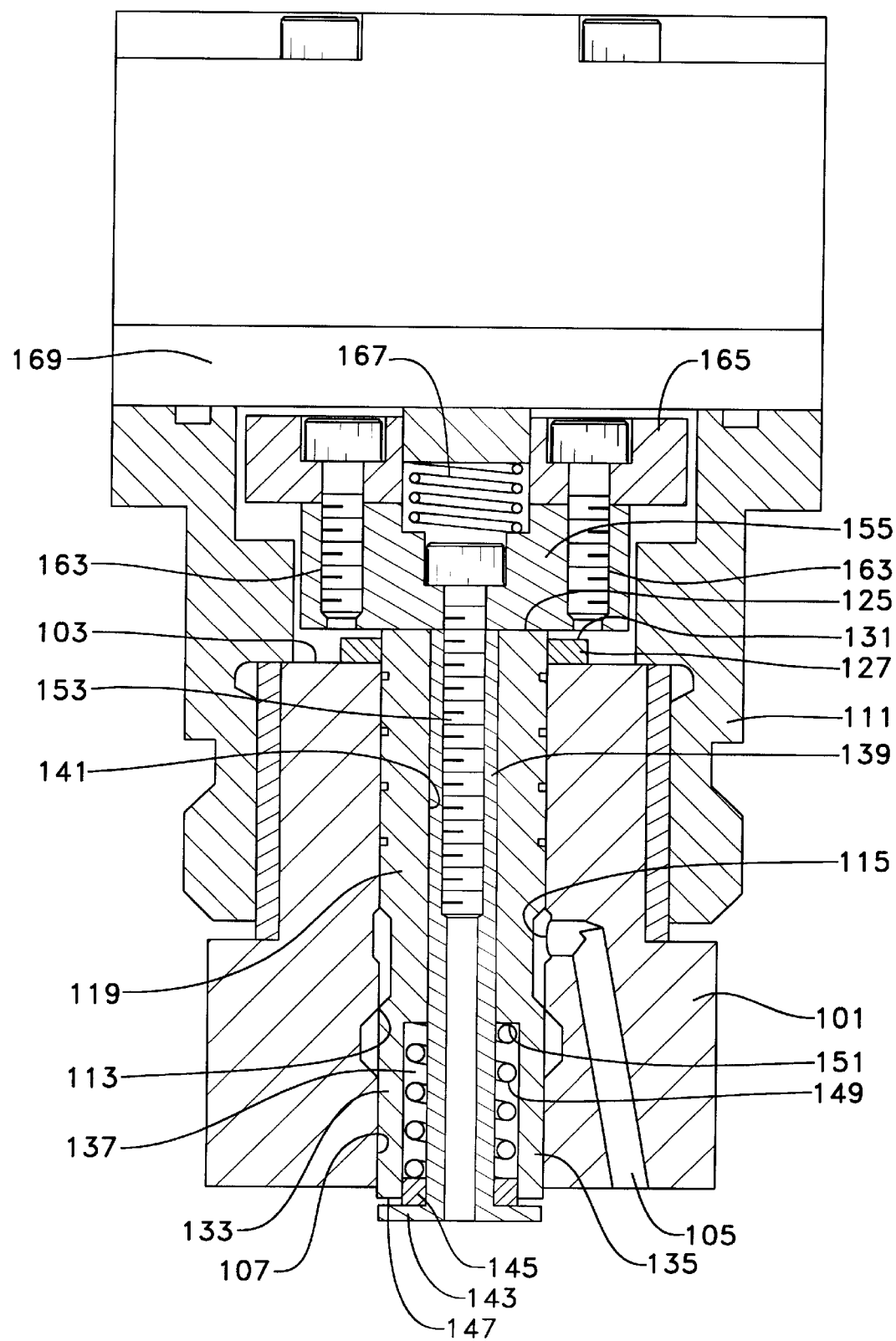
FIG. 2 is a diagrammatic sectional side view of the embodiment of FIG. 1 in a closed valve position.
Figure 3:
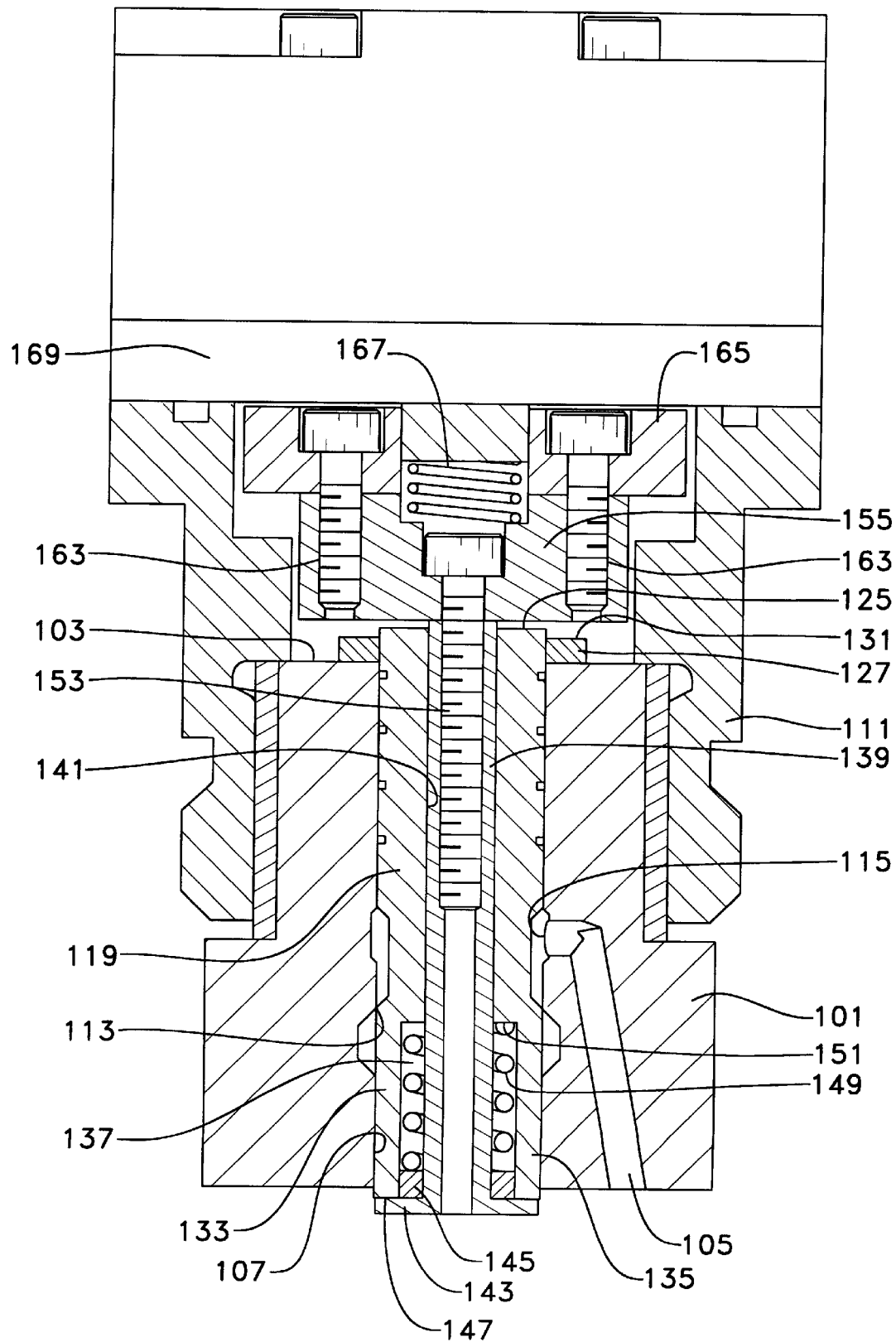
FIG. 3 is a diagrammatic sectional side view of the embodiment of FIG. 1 in a closed valve position, with an armature assembly fully extended toward the solenoid.

An embodiment incorporating the invention, illustrated in FIGS. 1–3, includes a valve body 101 having a body end surface 103, a fluid passage 105, and a body bore 107 having an axis normal to the body end surface 103. The valve body 101 is retained in position by a housing 111. A seat 113 and an inlet port 115 are formed in the body bore 107. The inlet port 115 is in fluid communication with the fluid passage 105.

A shuttle assembly including at least a spool 119 is located within the body bore 107. The spool 119 is slideable between an open valve position and a closed valve position. A spool end surface 125 of the spool 119 extends beyond the body end surface 103 and passes through a lift shim 127 that engages the body end surface 103 and defines a stop 131.

In an open valve position, illustrated in FIG. 1, the spool end surface 125 is flush with the stop 131 and the lift shim 127. In a closed valve position, illustrated in FIGS. 2 and 3, the spool end surface 125 extends beyond the stop 131 by a distance equal to the spool lift, and the spool 119 forcibly engages with the seat 113 to block fluid flow. The figures are exaggerated for ease of explanation; the actual spool movement between open and closed valve positions in this embodiment is quite small.

At a spool bias end 133 of the spool 119 opposite the end surface a spool chamber wall 135 surrounds a spool bias chamber 137. A slideable inner housing 139 is located within a spool bore 141 in the spool 119, extends through the spool bias chamber 137, and has a length slightly longer than the spool 119. The inner housing 139 includes an inner housing flange 143 at an end opposite the body end surface 103 of the valve body 101. A spool shim 145 bears against the inner housing flange 143. The spool chamber wall 135 proximate the inner housing flange 143 defines an inner housing stop 147. An coupler spring 149 is disposed in compression between the spool shim 145 and a counter bore 151 of the spool bias chamber 137.

In this embodiment the inner housing 139 and an armature 165 are integral parts of an armature assembly. An inner housing bolt 153 is threaded within the inner housing 139 and connects a coupling member 155 to the inner housing 139. The coupling member 155 in turn is coupled by armature bolts 163 to the armature 165. A base spring 167 is disposed in a recess between the coupling member 155 and a solenoid 169.

Figure 4:
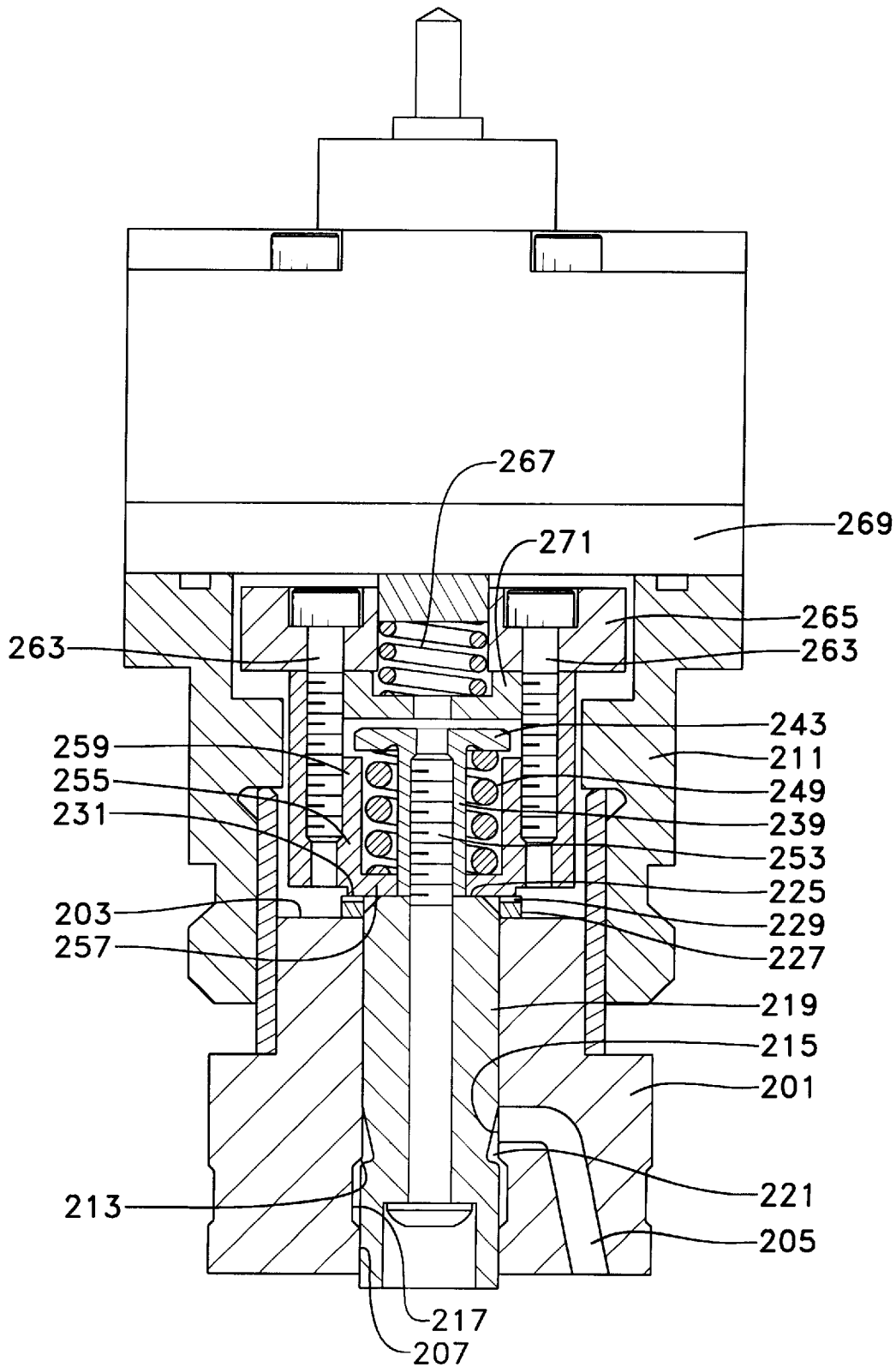
FIG. 4 is a diagrammatic sectional side view of another embodiment of the invention in an open valve position.
Figure 5:
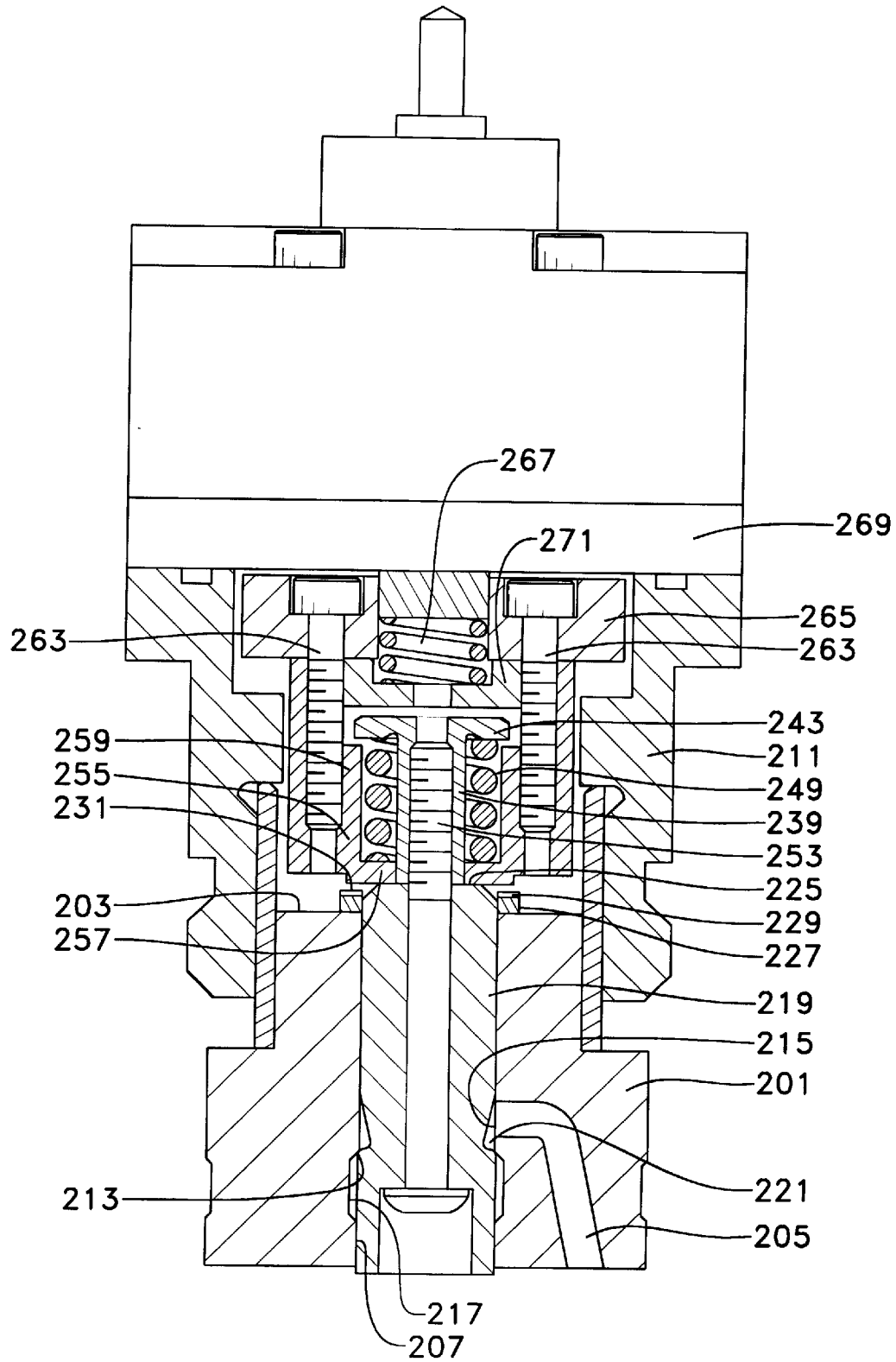
FIG. 5 is a diagrammatic sectional side view of the embodiment of FIG. 4 in a closed valve position.

Another embodiment incorporating the invention, illustrated in FIGS. 4–6, includes a valve body 201 having a body end surface 203, a fluid passage 205, and a body bore 207 having an axis 209 normal to the body end surface 203. The valve body 201 is retained in position by a housing 211. A seat 213, an inlet port 215, and an annulus 217 are formed in the body bore 207. As can be seen most clearly in FIG. 5, the inlet port 215 is in fluid communication with the fluid passage 205. The annulus 217 is in fluid communication with four horizontal spill lines (not shown) in the valve body 201.

A spool 219 is slideably disposed within the body bore 207. An annular groove 221 in the spool 219, together with the body bore 207, define an upstream fluid flow volume (i.e., a volume upstream of the seat 213) in fluid communication with the inlet port 215. A method of configuring the annular groove that can be successfully combined with this invention is disclosed in copending U.S. patent application 09/122,255, filed herewith. In this embodiment the annular groove 221 (FIG. 6) is configured such that the effective flow area 223a for fluid entering an upstream region 221a of the upstream fluid flow volume from the inlet port effectively equals the effective flow area 223b for fluid leaving a downstream region 221b (the flow area for fluid passing between the spool and the seat) when the spool 209 moves to its unseated position.

One method of calculating the effective flow area 223a in the upstream region 221a to achieve this configuration, as discussed in the abovementioned copending application, is to consider the case of fluid flowing from a round port onto a nearby flat plate, in which case the flow area is the circumference of the port times the distance of the port to the plate. Thus one good way of balancing the respective flow areas is to form the annular groove 221 so that the spool 209 touches the upstream edge of the inlet port 215 and angles away from the inlet port 215 in the downstream direction, as best illustrated in FIG. 6, such that (a) the circumference of the inlet port 215 multiplied by its average distance from the spool 209 equals (b) the width of the gap between the seat 213 and the spool 209, multiplied by the circumference defined by the center of that gap surrounding the spool 209.

A spool end surface 225 of the spool 219 extends beyond the body end surface 203 and passes through a lift shim 227 having a fluid pressure balancing groove 229. The lift shim 227 engages the body end surface 203 and defines a stop 231. In this embodiment an extension member 239 and the spool 219 are integral parts of a shuttle assembly. The extension member 239 is coupled to the spool 219 by an extension bolt 253, and has an extension flange 243 at its end opposite the spool 219.

The spool 219 is slideable between an open valve position and a closed valve position. In an open valve position, illustrated in FIGS. 4 and 6, the spool end surface 225 is flush with the stop 231. In a closed valve position, illustrated in FIG. 5, the spool end surface 225 extends beyond the stop 231 by a distance equal to the spool lift. The figures are exaggerated for ease of explanation; the actual spool movement between open and closed valve positions in this embodiment is only about 145 microns.

In this embodiment a coupling member 255 and an armature 265 are integral parts of an armature assembly. The coupling member 255 is coupled by armature bolts 263 to the armature 265. The coupling member 255 has a coupling flange 257 at its end opposite the armature 265. A coupling wall 259 is disposed around the extension member 239 and is engageable with the extension flange 243. Alternate embodiments may include a coupling terrace (not shown) extending from the coupling wall 259 opposite the coupling flange 257 and engageable with the extension flange 243. A coupler spring 249 is disposed in compression around the extension member 239 between the extension flange 243 and the coupling flange 257.

A base spring 267 is disposed in compression between a solenoid 269 and a bias plate 271 that is fixedly coupled to the armature 265.

INDUSTRIAL APPLICABILITY

In operation of the embodiment depicted in FIGS. 1–3, the solenoid 169 is actuated to move the valve from its open valve position (FIG. 1) to its closed valve position (FIGS. 2 and 3). When the solenoid 169 is actuated the spool 119, the armature 165, and the coupling member 155 move toward the solenoid 169. Because the inner housing 139 is secured by the inner housing bolt 153 to the coupling member 155, the inner housing 139 also moves toward the solenoid 169, providing a force that is transmitted through the coupler spring 149 to the spool 119. This force causes the spool 119 to move into contact with the seat 113, at which point movement of the spool 119 toward the solenoid 169 stops (FIG. 2).

However, the inner housing 139 slides within the spool 119, allowing the armature 165 and the coupling member 155 to move further toward the solenoid 169 against the force exerted by the coupler spring 149. The armature 165 and the coupling member 155 continue moving until the inner housing flange 143 of the inner housing 139 forcibly engages the inner housing stop 147, stopping the armature 165 just short of engaging with the solenoid 169 (FIG. 3). At this point, the coupling member 155 is spaced from the spool end surface 125. In addition, the spool 119 continues to be pushed against the seat 113 by a force determined at least in part by the force developed by the solenoid 169.

When the solenoid 169 is de-energized, the coupler spring 149 causes the inner housing 139 to slide back through the counter bore 151. The armature 165 and the coupling member 155 move toward the spool 119, eventually striking the spool end surface 125. The impact of the coupling member 155 against the spool end surface 125 causes the spool 119 to rapidly unseat. The movement of the spool 119 is cushioned by the coupler spring 149. The armature 165 continues to move until the coupling member 155 contacts the lift shim 127 surrounding the spool 119. At the open valve position (FIG. 1), fluid from an inlet port 115 can flow between the spool 119 and the seat 113.

In the embodiment depicted in FIGS. 4–6, the solenoid 269 is actuated to move the valve from its open valve position (FIGS. 4 and 6) to its closed valve position (FIG. 5). when the solenoid 269 is actuated the spool 219, the armature 265, and the coupling member 255 move toward the solenoid 269. The coupler spring 249 biases the spool 219 apart from the coupling member 255. The movement of the coupling flange 257 provides a force that is transmitted through the coupler spring 249 to the extension flange 243 of the extension member 239. This causes the spool 219 coupled with the extension member 239 to move the spool lift distance (about 145 microns in this embodiment) to the closed valve position. At this point the spool 219 seats, i.e., forcibly engages with the seat 213, fluid flow through the valve ceases, and movement of the spool 219 toward the solenoid 269 stops.

However, the armature 265 and the coupling member 255 continue to move toward the solenoid 269 (an additional 70 microns in this embodiment), further compressing the coupler spring 249 and the base spring 267, until the coupling wall 259 forcibly engages the extension flange 243 of the extension member 239. At that time there is still a gap between the armature 265 and the solenoid 269. The total force biasing the spool 219 against the seat 213 now equals the total attractive force of the solenoid 269 acting upon the spool 219, the armature 265, and the coupling member 255 combined, minus the repulsive force of the base spring 267.

When the solenoid 269 is de-energized, the combined compressive forces of the coupler spring 249 acting on the coupling flange 257 and the base spring 267 acting on the armature 265 cause the coupling member 255 to quickly move toward the spool 219. When the coupling flange 257 strikes the spool end surface 225 of the spool 219, the spool 219 rapidly unseats from the seat 213.

The configuration of the annular groove 221 (FIGS. 4–6) in this embodiment is such that the effective flow area 223a in the upstream region 221a (the flow area for fluid entering the upstream fluid flow volume from the inlet port) effectively equals the effective flow area 223b in the in the downstream region 221b (the flow area for fluid passing between the spool and the seat) as the spool 209 moves to its unseated position as explained above. This eliminates the pressure differential between the two regions 221a and 221b, so that quick unseating of the spool is further facilitated and the valve reaches maximum fluid flow condition as quickly as possible.

The armature 265 and the spool 219 then continue to move until the coupling member 255 contacts the stop 231 defined by the lift shim 227 surrounding the spool 219. This stops the movement of the coupling member 255 and the armature 265. When the spool 219 is flush with the lift shim 227 it is in open valve position and has moved a distance equal to the spool lift. At this point and beyond the spool 219 is considered fully unseated and in open valve position. Momentum carries the spool 219 a small distance beyond this point, but the coupler spring 249 quickly returns the spool 219 to its nominal fully unseated position flush with the lift shim 227 and in forcible engagement with (i.e., held hard against) the armature 265.

At its fully unseated position the spool 219 is held by the coupler spring 249 against the armature 265, which is itself held by the base spring 267 against the lift shim 227. As can be seen more clearly in FIG. 6, when the spool 219 is in its open valve position (FIGS. 4 and 6), fluid from the fluid passage 205 can flow through the inlet port 215 into the annular groove 221, past the seat 213, and into the annulus 217.

As can be seen from the above, at least a portion of the force between the solenoid 169, 269 and the armature 165, 265 continues to further bias the spool 119, 219 toward its seated position after the armature has stopped its motion away from the spool. This helps to keep the spool from momentarily bouncing off the seat when the armature's motion relative to the spool stops, for example. The spool also unseats very quickly to its full unseated position when the solenoid is de-energized, because after the solenoid is de-energized, the rapidly moving armature or coupling member 155, 255 can instantly impart its momentum to the seated spool.

The terms "forcibly engaging" and "forcible engagement" are used herein to describe two objects statically pushing against each other so that no further movement between them is possible. Such objects are to be considered in forcible engagement even if physically separated by a rigid third object that effectively transmits the force of the two objects pushing against each other.

While this invention has been described in conjunction with specific embodiments outlined above, it is evident that many alternatives, modifications and variations will be apparent to those skilled in the art. Accordingly, the preferred embodiments of the invention as set forth herein are intended to be illustrative, not limiting. Various changes may be made without departing from the scope of the claimed invention. Additionally, other aspects and advantages of this invention can be obtained from a study of the disclosure, the drawing figures, and the appended claims.

What is claimed is:

1. An electromagnetic valve in a fuel supply system, comprising:

a valve body including a bore therein, the bore comprising at least one seat;

a shuttle assembly including a spool disposed in the bore slideably between at least an open valve position in which the spool is spaced from the seat, and a closed valve position in which the spool is forcibly engaging the seat;

an armature assembly connected with the valve body, the armature:

moveable relative to the shuttle assembly;

moveable relative to the valve body along a total range of motion that is limited in a first direction by a first armature position relative to the valve body at which the armature assembly is forcibly engaged with the valve body, and is limited in a second direction opposite the first direction by a second armature position relative to the valve body at which the armature assembly is forcibly engaged with the shuttle assembly;

able to reach the first armature position only when the spool is at the fully open position;

able to reach the second armature position only when the spool is at the closed position; and able to reach an intermediate position between the first armature position and the second armature position at which the armature assembly is not forcibly engaged with the shuttle assembly;

an armature biasing member, connected with the armature assembly, that biases the armature in a first direction;

a coupler biasing member, connected with the armature assembly and with the shuttle assembly, that biases the armature assembly and the shuttle assembly toward each other; and a solenoid connected to the valve body and actuateable to move the armature assembly in the second direction, the armature assembly and the shuttle assembly disposed in the valve such that whenever the armature assembly is at the second armature position the armature assembly is prevented from moving any further in the second direction by the forcible engagement of the armature assembly with the shuttle assembly.

2. The valve of claim 1, wherein said armature biasing member and said coupling biasing member are springs.

3. The valve of claim 1, further comprising:

an upstream fluid flow volume in fluid communication with said seat, the upstream fluid flow volume defined at least in part by said bore and said spool;

an inlet port for admitting fluid to the upstream fluid flow volume; and means for keeping static fluid pressure from developing in the upstream fluid flow volume when the spool is at the fully open position and fluid is flowing from the inlet port to the seat via the upstream fluid flow volume.

4. The valve of claim 1, further comprising:

an upstream fluid flow volume in fluid communication with said seat, the upstream fluid flow volume defined at least in part by a portion of said spool and by a portion of said bore that is adjacent to said seat; and an inlet port for admitting fluid to the upstream fluid flow volume, the upstream fluid flow volume configured such that when the spool is at the fully open position an effective flow area for fluid entering the upstream fluid flow volume from the inlet port effectively equals an effective flow area for fluid passing between the spool and the seat.

5. A method for controlling an electromagnetic valve in a fuel supply system, the valve including a valve body including a bore therein, the bore comprising at least one seat, a shuttle assembly including a spool slideably disposed in the bore, an armature assembly movably connected with the valve body and movable relative to the shuttle assembly, and a solenoid connected to the valve body, comprising:

biasing the armature in a first direction;

biasing the armature assembly and the shuttle assembly toward each other;

actuating the solenoid to bias the armature assembly in a second direction opposite the first direction;

moving the armature assembly in the second direction;

closing the valve by sliding the spool in the bore in the second direction until the spool forcibly engages the seat;

while the spool is engaging the seat and is not sliding in the bore, continuing to move the armature assembly in the second direction until the armature assembly forcibly engages with the shuttle assembly, thereby immediately stopping the armature assembly from moving further in the second direction;

de-energizing the solenoid to cause the armature assembly to travel in the first direction until it strikes the shuttle assembly to unseat the spool; and opening the valve by sliding the spool in the bore in the first direction so that the spool is spaced from the seat.

6. The method of claim 5, further comprising increasing the bias of the armature assembly and the shuttle assembly toward each other while the spool is engaging the seat and is not sliding in the bore.

7. The method of claim 5, further comprising:

moving the armature assembly in the first direction while the spool is sliding in the bore in the first direction until the armature assembly forcibly engages a stop; and forcibly engaging the shuttle assembly with the armature assembly while the armature assembly is engaged with the stop and no longer moving in the first direction, to keep the spool from sliding in the bore.

8. The method of claim 5, wherein actuating the solenoid comprising creating an attractive force between the solenoid and the armature assembly.

9. The valve of claim 1, further comprising:

an upstream fluid flow volume in fluid communication with said seat, the upstream fluid flow volume defined at least in part by a portion of said spool and by a portion of said bore that is adjacent to said seat; and an inlet port for admitting fluid to the upstream fluid flow volume, the upstream fluid flow volume configured such that when the spool is at the fully open position the circumference of the inlet port multiplied by its average distance from the spool does not substantially exceed the smallest annular cross-sectional area between the spool and the seat.

* * * * *